United States Patent Office 2,790,732
Patented Apr. 30, 1957

2,790,732

ADHESIVE SHEET CONTAINING SPECIFIC MASS DEACTIVATORS

James A. McGarry, New Brunswick, Charles L. Weidner, Cranbury, and Milton A. Bergstedt, Linden, N. J., assignors to Industrial Tape Corporation, a corporation of New Jersey No Drawing. Original application April 29, 1949, Serial No. 90,544. Divided and this application September 22, 1952, Serial No. 310,938

10 Claims. (Cl. 117—122)

This invention relates to adhesives and more particularly to normally tacky and pressure-sensitive adhesive sheets or tapes. This application is a division of application Serial No. 90,544, filed April 29, 1949, by the same inventors, now Patent No. 2,646,371.

Most commercially useful adhesive sheets depend for utility upon a combination of backing and adhesive wherein the adhesive has greater affinity for the side of the backing to which it was applied than for the opposite side of the backing. If such a relation exists, several layers of adhesive sheets may be stacked or rolled one upon the other and stored in this condition for prolonged periods of time. The layers may be separated without damage to each individual adhesive sheet, whenever this is desired, and used in the conventional manner, for instance, to mask articles in painting or sandblasting operations, to bind articles, for instance, in packaging operations, to hinge sheets for instance in book binding, to mend or repair, for instance, in the case of clothing and for many other uses.

Two methods were used in the prior art to provide commercially the desired combination wherein the adhesive should have greater affinity toward the side of the backing to which it has been applied than toward the opposite side: 1. The backing was precoated on one side with a material, often called a primer or subbing coat, to increase its affinity for the pressure-sensitive adhesive and the pressure-sensitive adhesive was applied over this precoating. This method was preferred in the case of nonfibrous backings such as regenerated cellulose, cellulose acetate, rubber hydrochloride, vinyl chloride, or vinyl ester films, wherein the smoothness of the uncoated surface was thought to make adhesion of the adhesive mass to the uncoated surface difficult. 2. The backing was precoated with a material, sometimes called a repellent or backsize, that had very little affinity for the adhesive and the adhesive was applied to the surface opposite the precoating. This method was preferred in the case of fibrous backing such as nonwoven matted fabric, e. g. paper, and cotton, line or synthetic cloth. It was believed that in all of these cases the mechanical anchorage betwen fibrous backing and adhesive would aid in preventing transfer of the adhesive from the side of which it had been applied to the opposite side.

Unfortunately, neither of the two methods proved completely satisfactory, particularly in connection with the thin, fragile film backings that form the basis of a large percentage of the adhesive sheets in use. In the normal life of a stack of adhesive sheets and particularly of a tape roll, considerable expansion and contraction of the thin webs takes place prior to the ultimate use of the sheets. These physical forces are due in many cases to changes in temperature and humidity during transportation and storage and in some cases to strain imposed upon the adhesive sheets during manufacture and stacking. They exert such a frictioning and welding effect upon each layer in the stack that prior to its ultimate use the adhesive is frequently united so strongly to both adjacent backing surfaces, whether pretreated or not, that separation of adjacent adhesive sheet layers for use is made extremely difficult. In the worst cases some adhesive mass transfers during stacking from the side of the sheet to which it had been applied to the opposite side, providing an irregular and unsightly adhesive sheet product. In many other cases considerable force is required to separate adjacent layers of the product prior to use, and frequently the force that has to be used to separate the layers is so great that breaks and splits in the backing occur prior to separation, making satisfactory use of the product impossible. Moreover, in the case of adhesive sheets made in accordance with the second of the methods outlined above, the location and nature of the "repellent" coating acted frequently to defeat the purpose of making a readily useful product. Usually the materials which can be considered to have the best repellent properties have not much more affinity for the backing surface to which they are applied than they have for the adhesive mass. Under these circumstances and under the strains that a thin repellent coating undergoes during manufacture, storage and unrolling, it is quite common for the repellent coating to transfer from the back surfaces to which it has been applied to the adjacent surfaces of the adhesive. The result is a product wherein the adhesive is coated with a substantial, often irregular, film of non-tacky repellent. In this case the adhesive becomes inactive and inoperative, and the adhesive sheet useless.

The above described difficulties are responsible for many of the complaints involving adhesive sheets.

This invention is based upon the surprising discovery that adhesive sheets relatively free of the difficulties mentioned above and satisfactory under a wide variety of conditions result from preparation of the adhesive sheet in any conventional manner after addition to the normally tacky and pressure-sensitive adhesive mass of one or more specific deactivators that decrease the affinity of the mass to the opposite surface of the adhesive sheet without decreasing its affinity for most other surfaces to which it may be attached in use. Suitable specific deactivators fall within a class of products having several well defined physical properties. Such specific deactivators are 1. surface active; 2. water-insoluble and oil-soluble emulsifiers of the water-in-oil type; 3. materials having solidification points in excess of $-10°$ C.; and 4. dispersible in the adhesive mass with which they are used. Such materials lower the adhesion of adhesives in which they are incorporated in a selective manner by reducing the adhesion to materials of the hydrophylic type relatively much more than they reduce the adhesion to hydrophobic materials.

For practical purposes the following commercial products are most suitable as specific deactivators for tacky and pressure-sensitive adhesive masses: diethylene glycol oleate; diethylene glycol stearate; glycerol monostearate; pentaerythritol monostearate; polyethylene glycol (di, tri) ricinoleate; propylene glycol monostearate; sorbitan monostearate; and the stearyl amine salt of the stearyl amide of orthophosphoric acid having the formula:

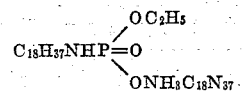

Compounds comprising long chain aliphatic groups having 9–20 carbon atoms and compounds comprising phosphorus and nitrogen in addition to carbon, hydrogen and oxygen are preferred.

Most, although, as has been shown, not all of the specific deactivators are esters of fatty acids. In accordance with Traube's rule [Traube, J. prak. Chem., N. F., 31, 177, 514 (1885); 34, 292, 515 (1886); Lieb. Ann., 265, 27 (1891); Rehbinder, Z. physik. Chem., 111, 447 (1924)] close homologs within each series behave in an expected manner with the heavier compound more active than the next lighter one. Thus, palmitates, margarates, nonadecanates and arachidates are active in a manner similar to that of stearates as are oleates, linoleates and linolenates.

The specific deactivators comprise normally from about one-eighth of a percent to about five percent by weight of the solids content of the adhesive mass, and preferably from about one-half to about three percent by weight, although even addition of minute amounts of less than one-eighth percent, gives some minor improvement. In the case of the stearyl amine salt of the stearyl amide of orthophosphoric acid the lower part of the normal range is preferred, namely one-eighth percent to two percent. The adhesive mass itself may be any of the normally tacky and pressure-sensitive adhesive masses that are so well known in the prior art although the invention is of greatest utility in the case of adhesive based on relatively non-polar elastomers such as natural rubber, synthetic polyisoprene and the vulcanizable elastomeric copolymers and interpolymers of at least 40 percent butadiene and at least 10 percent styrene. The adhesive mass may be especially compounded, copolymerized or interpolymerized to have the desired degree of adhesiveness in absence of additional tackifiers. Or, alternatively, any of the conventional tackifiers may be used such as rosin, hydrogenated rosin, dehydrogenated rosin, the glycols and glycerides of any of these rosinous materials, polyterpenes, coumarone indene resins, polyalkyl styrenes, oil-soluble phenol aldehyde resins such as the ones disclosed in Drew Patent 2,410,053, patented Oct. 29, 1946, or any other desired tackifier in any of the proportions that are so well known in the art. The adhesive mass may be free of in inert filler or may contain inert filler such as zinc oxide, magnesium carbonate, calcium carbonate, lead oxide, clay, titanium dioxide, aluminum, hydrated alumina, pulverized glass, silica or any of the other conventional filler for normally tacky and pressure-sensitive adhesives. Other ingredients such as antioxidants or heat stabilizers, dyes or pigments may be present or absent depending upon the particular desired use for the adhesive sheet. Typical normally tacky and pressure-sensitive adhesive masses are disclosed in Johnson & Johnson's British Patent No. 611,211, issued October 1948; in Nelson Patent 2,415,901, issued February 18, 1949; in Priepke Patent 2,405,926, issued August 13, 1946 and in many other patents, including Buckley Patent 2,397,774, issued April 2, 1946.

Many of the adhesive masses utilizing specific deactivators are of resinous character making unwinding of adhesive sheets rather noisy and somewhat uneven, characteristically jerky. In these cases inclusion of a stable oil in the adhesive mass composition improves unwinding characteristics and, as will be shown in the examples, has in some cases a synergistic effect on deactivation. Although any amount of oil has some effect on unwinding, amounts of from about ½ to about 10 percent by weight of oil are preferred. The oils selected may be of any desired type as long as they are stable in the adhesive mass. Such widely different oils as soybean oil and mineral oil [1] give excellent results.

The adhesive sheet may be a nonfibrous film backing or a fibrous woven or nonwoven backing or, alternatively, may be composed of laminations of such materials. Whether woven or nonwoven, fibrous or nonfibrous, the backings in connection with which specific deactivators are of greatest utility are: regenerated cellulose; cellulose esters such as cellulose acetate, cellulose acetate propionate, cellulose propionate, cellulose acetate butyrate, and cellulose butyrate; cellulose ethers such as methyl cellulose and ethyl cellulose; glass; polyvinyl alcohol; and, other strongly hydrophilic polar materials. The specific deactivators have little or no deactivating effects in the case of rubber hydrochloride, polyethylene, stainless steel and other non-polar hydrophobic materials, vinyl chloride acetate, phenol aldehyde resins, and, in some cases, even increase the adhesion to metal oxides, for instance, of the type that is found on the surface of brass. The backing may be without a coating other than the normally tacky and pressure-sensitive adhesive mass or it may be precoated as mentioned earlier in this specification, for instance, in accordance with Morris Patent 2,424,996, issued August 5, 1947; Billings Patent 2,340,298, issued February 1, 1944; or Johnson & Johnson's British Patent 608,127, issued September 10, 1948.

To illustrate representative embodiments of the invention by way of example only and not to limit the scope of the invention in any way, several examples of preferred embodiments are shown. The proportions in all of these examples are furnished as parts by weight of the adhesive compositions.

EXAMPLE I

| Formulation | Parts by Weight |
| --- | --- |
| Natural Rubber, e. g. Pale Crepe Rubber | 100.0. |
| Hydrogenated Rosin Glyceride (Melting Point 84° C.) | 25.0. |
| Polymer of Unsaturated Terpadiene (Melting Point 115° C.) | 25.0. |
| Antioxidant (e. g. Diamyl Hydroquinone) | 2.0. |
| Glyceryl Monostearate | 1.52 (0.97 percent of adhesive mass solvents). |

The above formulations were prepared by mixing solutions of the adhesive mass ingredients in aliphatic solvents e. g. of the normal heptane type or aromatic solvents of the toluene type and adding to the mixed solution glyceryl monostearate that was dispersed in toluene that had been heated to approximately 50 to 75° C. The solutions were adjusted so as to provide a concentrated solution having, depending upon the preferred coating material, 10 to 70 percent solids in the indicated relative proportions. This adhesive mass was coated on regenerated cellulose film, for instance, of the type that had been primed in accordance with Billings Patent 2,340,298 mentioned above, to provide a coating weight of approximately one ounce of adhesive mass per square yard. In repeated experiments adhesive tape prepared as above was found to exhibit an adhesion to stainless steel that exceeded the adhesion to its own uncoated backing by seventy percent. A control experiment made in the identical manner except for the omission of the specific deactivator, glyceryl monostearate, was found to adhere exactly to the same extent to stainless steel as to its own uncoated backing.

To exhibit the variation in deactivating effect, depending upon the type of backing that is used, the following comparison of percentage deactivation against various backings, comparing the above deactivator with the corresponding deactivator-free adhesive mass, is furnished:

| Backing | Percentage Loss in Adhesion |
| --- | --- |
| Cellophane | 41. |
| Cellulose Acetate Butyrate | 25. |
| Ethyl Cellulose | 18. |
| Cellulose Acetate | 13. |
| Glass | 12. |
| Rubber Hydrochloride | 0. |
| Polyethylene | 0. |
| Stainless Steel | 0. |
| Vinyl Chloride Acetate Polymer | 0. |
| Cured Phenol Aldehyde Resin | 0. |
| Oxides on the Surface of Brass | −31 (Actual increase in adhesion). |

---

[1] Including, for instance, bland aliphatic oil, free of aromatic material.

While most of the above percentage deactivations were measured against film backings as such data are easiest to obtain quantitatively and reproducibly, it should be understood that similar effects can be observed qualitatively in the case of the corresponding fibrous backings.

Several other examples with widely varied specific deactivators, adhesive masses and backings are illustrated in the table that follows.

|  | II | III | IV | V | VI | VII | VIII | IX | X | XI |
|---|---|---|---|---|---|---|---|---|---|---|
| Diethylene Glycol Oleate | 1.5 | | | | | | | | | |
| Diethylene Glycol Stearate | | 1.5 | | | | | | | | |
| Glyceryl Monostearate | | | 1.5 | | | | | | | |
| Pentaerythritol Monostearate | | | | 1.5 | | | | | | |
| Polyethylene Glycol (di, tri) Ricinoleate (molecular Weight [1] Approx. 400) | | | | | 1.5 | | | | | |
| Propylene Glycol Monostearate | | | | | | 1.9 | | | | |
| Sorbitan Monostearate, Commercial Grade, Insoluble in Hot Mineral and Vegetable Oils | | | | | | | | 1.5 | | |
| Sorbitan Monostearate, Commercial Grade, Soluble in Hot Mineral and Vegetable Oils | | | | | | | 1.5 | | | |
| Stearyl Amine Salt of the Stearyl Amide of Ortho-Phosphoric Acid Formula: $C_{18}H_{37}NHP(OC_2H_5)(=O)(ONH_3C_{18}H_{37})$ | | | | | | | | | 0.9 | 0.4 |
| Percent of Specific Deactivator Based on Total Solids in Mass | (1.0) | (1.0) | (1.4) | (1.0) | (1.4) | (1.7) | (1.0) | (1.0) | (0.5) | (0.3) |
| Butadiene-Styrene Copolymer Rubber (71 percent Butadiene, 29 percent Styrene, Mooney Viscosity 54) | | | | 100.0 | | | | | | |
| Polyacrylate Interpolymer comprising 50% Octyl Acrylate, 30% Ethyl Acrylate and 20% Vinyl Acetate, Intrinsic Viscosity at 20° C. 1–2 | | | | | | | | | 100.0 | 100.0 |
| Polyvinyl Ethyl Ether, Amorphous, Intrinsic Viscosity 2.37 | | | 100.0 | | 100.0 | | | | | |
| Rubber, Natural | 100.0 | 100.0 | | | | 120.0 | 100.0 | 100.0 | | |
| alpha-Methyl Styrene Polymer (Viscosity 700–1,000 c.p.s. at 60° F.) | | | | | | | | | 40.0 | 40.0 |
| Polyterpene (Melting Point 115° C.) | 25.0 | 25.0 | | 25.0 | | 66.0 | 25.0 | 25.0 | | |
| Rosin Glyceride, Hydrogenated (Melting Point 84° C.) | 25.0 | 25.0 | | 25.0 | | | 25.0 | 25.0 | | |
| Rosin, Hydrogenated | | | 5.0 | | 5.0 | | | | | |
| Calcium Carbonate, Finely Divided | | | | | | | | | 25.0 | 25.0 |
| Antioxidant (e. g. Diamyl Hydroquinone, Dibutyl Hydroquinone or Phenyl Alpha-Naphthylamine) | 2.0 | 2.0 | 0.4 | 2.5 | 0.4 | 2.5 | 2.0 | 2.0 | | |
| Principal Tests made on: Regenerated Cellulose Type Backing | yes | yes | | yes | | yes | yes | yes | yes | yes |
| Cellulose Acetate Type Backing | | | yes | | yes | | | | | |
| Adhesion to Backing in Tests lower than without Specific Deactivator by (average) percent | 18 | 18 | 35 | 35 | 42 | 67 | 58 | 62 | 40 | 34 |
| Adhesion to Stainless Steel type Surface lower than without Specific Deactivator by (average) percent | 0 | 13 | 11 | 13 | 6 | 30 | 7 | 20 | 0 | 0 |

[1] The molecular weight given is the molecular weight of the glycol from which the product is formed.

The adhesive masses of the above examples are applied in any conventional manner, for instance, in a manner similar to the method described in connection with Example I. The acrylate polymer and the butadiene-styrene copolymer are milled to the desired consistency before compounding with the remaining ingredients. The cellulose acetate film may be precoated with a primer or subbing coat comprising at least ten percent butadiene-acrylonitrile copolymer (preferably not more than ninety percent butadiene nor less than ten percent acylonitrile).

The adhesive masses may be applied to coating weights varying from one-half to five ounces per square yard. Coating weights of three-quarters to two ounces are preferred for non-fibrous backings, while coating weights of one and one-half to four ounces are preferred for fibrous backings, depending upon the nature and thickness of the specific backing, and upon the adhesive and elastic nature of the adhesive, and also upon the purpose of the adhesive sheet.

All data on adhesion reported herein were obtained in accordance with Designation D 903–46 T of the American Society for Testing Materials as issued in 1946 and accepted by the Administrative Committee on Standards of the Society on December 5, 1946.

Many other variations of the above described invention will be apparent to those skilled in the art and are included in the inventive concept.

The claims are:

1. An adhesive sheet comprising: a backing having hydrophilic characteristics and a coating of a normally tacky and pressure-sensitive adhesive mass comprising a major proportion by weight of a lower alkyl vinyl ether polymer united to said backing; said adhesive mass including a tackifying agent in an amount to render the adhesive mass normally tacky and pressure-sensitive and a minor proportion, not more than five per cent by weight, of glyceryl monostearate as specific deactivator for said adhesive mass.

2. An adhesive sheet comprising: a backing having hydrophilic characteristics and a coating of a normally tacky and pressure-sensitive adhesive mass united to said backing; said adhesive mass including a major portion of at least one elastomeric base selected from the group consisting of: natural rubber; synthetic polyisoprene; the vulcanizable elastomeric polymers and interpolymers of from about 40 to about 90 percent butadiene and from about 10 to about 60 percent styrene; polyacrylate copolymers and interpolymers; and the lower vinyl ether polymers: a tackifying agent in an amount to render the adhesive mass normally tacky and pressure-sensitive, and a minor proportion, about one-half to about five per cent by weight, of glyceryl monostearate as specific deactivator for said adhesive mass.

3. An adhesive sheet comprising a backing having hydrophilic characteristics and a coating of a normally tacky and pressure-sensitive adhesive mass united to said backing; said adhesive mass including a major portion of at least one elastomeric base selected from the group consisting of: natural rubber; synthetic polyisoprene; the vulcanizable elastomeric polymers and interpolymers of from about 40 to about 90 percent butadiene and from about 10 to about 60 percent styrene; polyacrylate copolymers and interpolymers; and the lower vinyl ether polymers; a tackifying agent in an amount to render the adhesive mass normally tacky and pressure-sensitive, and a minor proportion, not more than five percent by weight, of a specific mass deactivator which is a monoester of a polyhydric alcohol and a fatty acid, said acid having 16–20 carbon atoms and including 0 to 2 unsaturated linkages per molecule, and said monoester having the property of reducing the adhesion of said adhesive mass to materials having hydrophilic characteristics relatively much more than it reduces the adhesion of said adhesive mass to materials having hydrophobic characteristics, which deactivator is: (1) surface active; (2) a water-insoluble and oil-soluble emulsifier of the water-in-oil type; (3) a material having a solidification point in excess of $-10°$ C.; (4) dispersible in said adhesive mass.

4. An adhesive sheet comprising: a backing of regenerated cellulose and a coating of a normally tacky and pressure-sensitive adhesive mass united to said backing, said adhesive mass including a major portion of at least one elastomeric base selected from the group consisting of: natural rubber; synthetic polyisoprene; the vulcanizable elastomeric polymers and interpolymers of from about 40 to about 90 percent butadiene and from about 10 to about 60 percent styrene; polyacrylate copolymers and interpolymers; and the lower vinyl ether polymers; a tackifying agent in an amount to render the adhesive mass normally tacky and pressure-sensitive, and a minor proportion, from about one-half to about three percent by weight, of a polyhydric alcohol monostearate as specific mass deactivator having the property of reducing the adhesion of said adhesive mass to materials having hydrophilic characteristics relatively much more than it reduces the adhesion of said adhesive mass to materials having hydrophobic characteristics, which deactivator is: (1) surface active; (2) a water-insoluble and oil-soluble emulsifier of the water-in-oil type; (3) a material having a solidification point in excess of $-10°$ C.; (4) dispersible in said adhesive mass.

5. An adhesive sheet comprising: a backing having hydrophilic characteristics and a coating of a normally tacky and pressure-sensitive adhesive mass united to said backing; said adhesive mass including a major portion of at least one elastomeric base selected from the group consisting of: natural rubber; synthetic polyisoprene; the vulcanizable elastomeric polymers and interpolymers of from about 40 to about 90 percent butadiene and from about 10 to about 60 percent styrene; polyacrylate copolymers and interpolymers; and the lower vinyl ether polymers; a tackifying agent in an amount to render the adhesive mass normally tacky and pressure-sensitive, and a minor proportion, not more than five percent by weight, of propylene glycol monostearate as specific deactivator for said adhesive mass.

6. An adhesive sheet comprising: a backing having hydrophilic characteristics and a coating of a normally tacky and pressure-sensitive mass united to said backing; said adhesive mass including a major portion of at least one elastomeric base selected from the group consisting of: natural rubber; synthetic polyisoprene; the vulcanizable elastomeric polymers and interpolymers of from about 40 to about 90 percent butadiene and from about 10 to about 60 percent styrene; polyacrylate copolymers and interpolymers; and the lower vinyl ether polymers; a tackifying agent in an amount to render the adhesive mass normally tacky and pressure-sensitive, and a minor proportion, about one-eighth to about three percent by weight of the stearyl amine salt of the stearyl amide of ortho-phosphoric acid of the formula

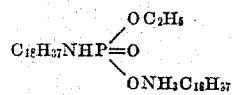

as specific deactivator for said adhesive mass.

7. An adhesive sheet comprising: a backing having hydrophilic characteristics and a coating of a normally tacky and pressure-sensitive adhesive mass united to said backing; said adhesive mass including a major portion of at least one elastomeric base selected from the group consisting of: natural rubber; synthetic polyisoprene; the vulcanizable elastomeric polymers and interpolymers of from about 40 to about 90 percent butadiene and from about 10 to about 60 percent styrene; polyacrylate copolymers and interpolymers; and the lower vinyl ether polymers; a tackifying agent in an amount to render the adhesive mass normally tacky and pressure-sensitive, and a minor proportion, not more than five percent by weight, of diethylene glycol oleate as specific deactivator for said adhesive mass.

8. An adhesive sheet comprising: a backing having hydrophilic characteristics and a coating of a normally tacky and pressure-sensitive adhesive mass comprising largely vinyl ether polymer united to said backing; said adhesive mass including a tackifying agent in an amount to render the adhesive mass normally tacky and pressure-sensitive and a minor proportion, not more than five percent by weight, of polyethylene glycol ricinoleate as specific deactivator for said adhesive mass.

9. An adhesive sheet comprising: a cellulose acetate backing having hydrophilic characteristics and a coating of a normally tacky and pressure-sensitive adhesive mass comprising largely vinyl ether polymer united to said backing; said adhesive mass including a tackifying agent in an amount to render the adhesive mass normally tacky and pressure-sensitive and a minor proportion, not more than five percent by weight, of polyethylene glycol ricinoleate as specific deactivator for said adhesive mass.

10. An adhesive sheet comprising a backing having hydrophilic characteristics and a coating of a normally tacky and pressure-sensitive adhesive mass united to said backing; said adhesive mass including a major portion of at least one elastomeric base selected from the group consisting of: natural rubber; synthetic polyisoprene; the vulcanizable elastomeric polymers and interpolymers of from about 40 to about 90 percent butadiene and from about 10 to about 60 percent styrene; polyacrylate copolymers and interpolymers; and the lower vinyl ether polymers; a tackifying agent in an amount to render the adhesive mass normally tacky and pressure-sensitive, and a minor proportion, not more than five percent by weight, of at least one specific mass deactivator having the property of reducing the adhesion of said adhesive mass to materials having hydrophilic characteristics relatively much more than they reduce the adhesion of said adhesive mass to materials having hydrophobic characteristics, which deactivators are: (1) surface active; (2) water-insoluble and oil-soluble emulsifiers of the water-in-oil type; (3) materials having a solidification point in excess of $-10°$ C.; (4) dispersible in said adhesive mass and which deactivators are selected from the group consisting of: diethylene glycol oleate; diethylene glycol stearate; glycerol monostearate; pentaerythritol monostearate; propylene glycol monostearate; sorbitan monostearate; and the stearyl amine salt of the stearyl amide of ortho-phosphoric acid.

References Cited in the file of this patent

UNITED STATES PATENTS

| | | |
|---|---|---|
| 2,319,959 | Tierney | May 25, 1943 |
| 2,349,508 | Mack | May 23, 1944 |
| 2,365,020 | Stillwell | Dec. 12, 1944 |
| 2,377,647 | Pragoff | Jan. 5, 1945 |
| 2,415,901 | Nelson et al. | Feb. 18, 1947 |
| 2,566,514 | Bischoff | Sept. 4, 1951 |